United States Patent [19]

Frickman et al.

[11] Patent Number: 4,921,614
[45] Date of Patent: May 1, 1990

[54] AQUARIUM CLEANING AND FILTERING SYSTEM AND METHOD

[76] Inventors: Jay P. Frickman, 2365 Madison Rd., #209, Cincinnati, Ohio 45208; William E. Kissick, Jr., 911 Cramer Ave., Apt. 1, Lexington, Ky. 40502; Kevin R. McMahon, 41 W. Villa Pl., Ft. Thomas, Ky. 41075

[21] Appl. No.: 237,930

[22] Filed: Aug. 29, 1988

[51] Int. Cl.$^5$ ............................................. A01K 63/04
[52] U.S. Cl. ................................. 210/695; 210/169; 210/223; 210/416.2; 15/1.7; 15/220 A; 119/5
[58] Field of Search ............... 210/169, 223, 416.2, 210/695; 134/6; 15/220 A, 1.7; 119/5

[56] References Cited

U.S. PATENT DOCUMENTS

| | | | |
|---|---|---|---|
| 3,208,090 | 9/1965 | Roesel, Jr. | 119/5 |
| 3,529,574 | 9/1970 | Kelley | 210/169 |
| 3,722,685 | 3/1973 | Orensten et al. | 210/169 |
| 3,759,223 | 9/1973 | D'Andrea | 119/5 |
| 3,785,342 | 1/1974 | Rogers | 119/5 |
| 3,814,254 | 6/1974 | Schatz | 210/169 |
| 3,817,382 | 6/1974 | Arneson | 210/169 |
| 3,963,798 | 9/1976 | White | 210/169 |
| 4,098,230 | 7/1978 | Jackson | 119/5 |
| 4,123,359 | 10/1978 | Smith | 210/169 |
| 4,148,730 | 4/1979 | Willinger | 210/169 |
| 4,216,090 | 8/1980 | Dockery | 210/169 |
| 4,752,388 | 6/1988 | Ng | 210/169 |

FOREIGN PATENT DOCUMENTS 2042148 12/1971 Fed. Rep. of Germany ... 15/220 A
2105977 4/1983 United Kingdom ............ 15/220 A Primary Examiner—Richard V. Fisher
Assistant Examiner—Coreen Y. Lee
Attorney, Agent, or Firm—Willian Brinks Olds Hofer Gilson & Lione

[57] ABSTRACT

A system and method for removing waste and debris from an aquarium tank and from the water supply therein without having to empty the tank or remove the fish therefrom. The apparatus comprises a movable cleaning means positioned adjacent the bottom surface of the tank, means for expelling waste and debris from adjacent the bottom surface of the tank and means for moving the cleaning means along the bottom surface of the tank so that the movable cleaning means dislodges waste and debris deposited thereon and directs the dislodged waste and debris generally toward the expelling means to be expelled thereby. The cleaning means preferably comprises a barrier structure having a metallic element incorporated therein, and the moving means preferably comprises a magnetic source, such as a hand-held permanent magnet, positioned externally of the tank beneath the underside thereof to move the barrier structure along the bottom surface by magnetic attraction. The expelling means preferably includes a water directing means for drawing water having dislodged waste and debris upwardly from adjacent the bottom surface of the tank. The drawn water may be filtered and returned to the aquarium or disposed of and replaced with fresh water.

27 Claims, 2 Drawing Sheets

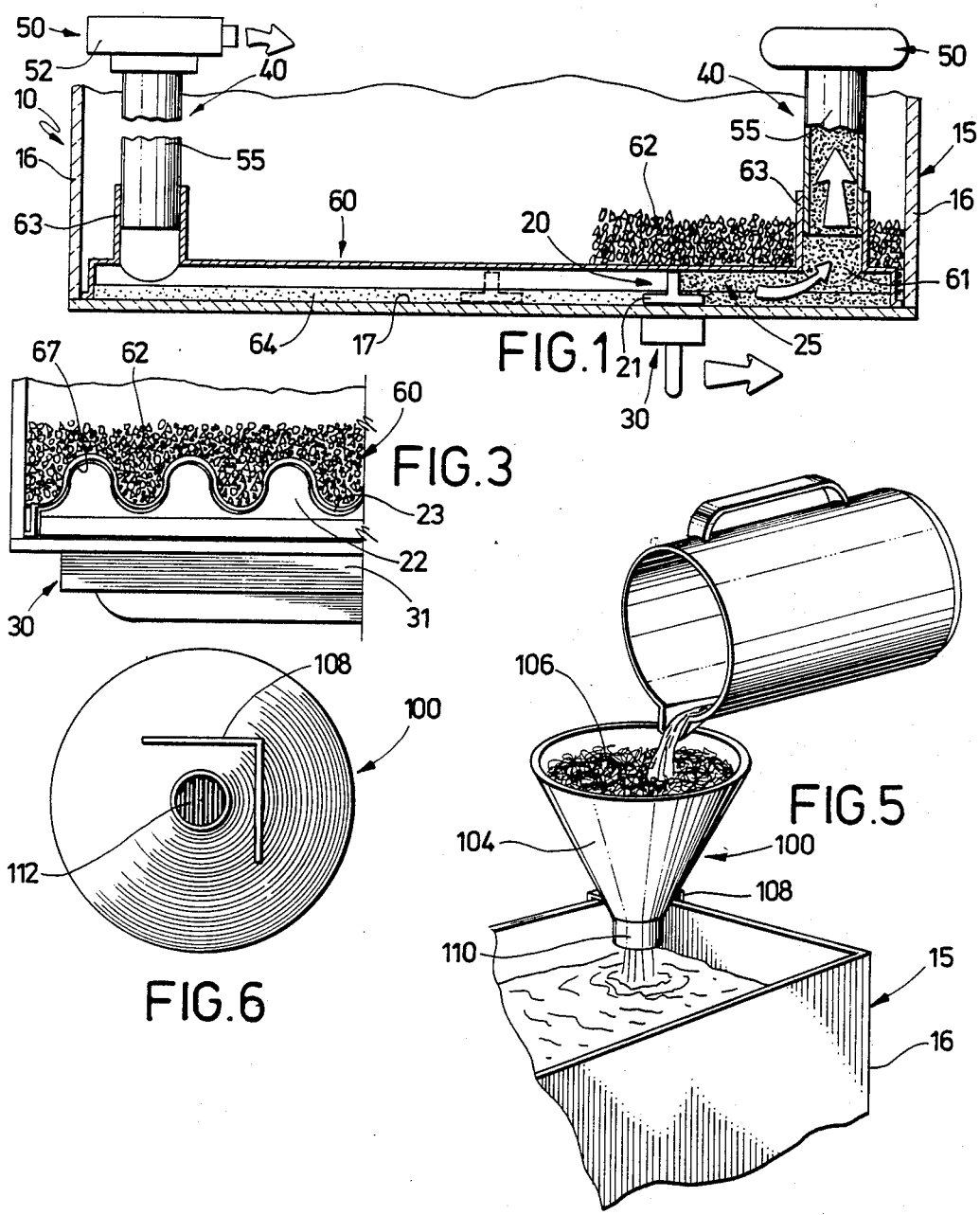

AQUARIUM CLEANING AND FILTERING SYSTEM AND METHOD

TECHNICAL FIELD

This invention relates to systems and methods for maintaining fish aquariums, and, more particularly, to a system and method for removing particulate waste deposits and chemical impurities from an aquarium tank and from the water supply retained therein without having to remove the fish or other articles from the tank.

BACKGROUND ART

A common problem experienced by owners of domestic fish aquariums is the necessity of periodically cleaning the tank and other aquarium components and its water supply to remove dissolved organic waste matter, particulate debris, chemical impurities such as ammonia and nitrate, and the like. The aquatic plants and animals living in an aquarium continuously shed or secrete particulate debris and dispense chemical impurities into the water supply, and it is necessary that the tank be routinely cleaned and that the water supply be routinely filtered to maintain a healthy environment in which the aquatic plants and animals may live.

Many domestic fish aquariums presently maintained in the United States include a perforated structure supported adjacent the bottom of the tank which is adapted to support a layer of gravel or similar rock material thereon, and aerating and water directing means for circulating air through the water to both supply oxygen to the aquatic plants and animals and to induce the water in the tank to circulate downwardly through the gravel bed and the perforated structure. The gravel bed acts to filter out physical impurities suspended in the water such as organic fish waste; and aerobic bacteria living in the gravel bed convert the organic waste into non-toxic gases which are then released into the water supply.

The conventional method of cleaning aquarium tanks generally requires that the aquatic plants and animals be removed from the tank along with the water, gravel, perforated structure and any other articles that may be within the tank. The gravel is then washed to remove particulate matter deposited thereon, and the tank is cleaned manually by scrubbing the interior walls to remove sedimentary deposits thereon. This task is time-consuming, laborious and very unpleasant; and the periodic cleaning of aquariums is generally the maintenance chore most commonly despised by owners of aquariums.

After the tank has been cleaned, the perforated structure, gravel and other articles are placed back in the tank, the tank is filled with fresh water and the fish and plants are returned to the tank. The fresh water used to refill the tank is not chemically equivalent to the water that has been removed, and provides an uncomfortable aquatic environment for the plants and animals. The fish are shocked when they are put back into the tank and remain agitated by the chemically unbalanced fresh water until they become accustomed to the water and the water approaches a proper chemical balance comfortable to the fish.

A conventional filter system such as described above is commonly referred to as an "undergravel filter" system. In such systems, the perforations in the support structure allow water and particulate matter to flow therethrough but prevent the gravel material from passing therethrough. The gravel bed acts as a filter as the aerobic bacteria living therein break down organic fish waste which has collected within the bed.

Systems for removing impurities from a fish aquarium water supply are known. One prior system, disclosed in U.S. Pat. No. 4,752,388, provides an undergravel fish tank filter comprising filter means; a rigid support for a gravel bed, and drive means for causing water from below the support to flow through the filter means. The water drawn from the base of the fish tank first passes downwardly through the gravel resting on the support to filter out part of the impurities from the water before the water is passed to the filter means. The drive means comprises a nozzle and an air tube. The nozzle extends upwardly from a chamber which is communicatively connected to the rigid support. Compressed air fed into the air tube issues in the form of bubbles which float upwardly from the tube, inducing a flow of water from below the structure to flow through the filter means, and out of the nozzle back into the main water body of the tank. The rigid support is also provided with apertures formed therein to ensure that large particulate material accumulating below the structure may be suctioned out from below the support.

A major shortcoming of such undergravel filter systems is that only a portion of the solid particulate matter in the water is trapped in the gravel bed to be broken down by the bacteria; a substantial portion of the matter passes through the perforations in the support structure and collects on the bottom surface of the tank. Furthermore, the draw created by the drive means is often insufficient to dislodge the particulate matter which deposits on the bottom surface of the tank, thereby failing to induce the matter to flow through the filtering device where it may be substantially removed from the water. The tank, therefore, must still be cleaned periodically by the conventional method to remove the particulate deposits on the bottom surface of the tank.

Other prior aquarium maintenance and filtration systems are exemplified by U.S. Pat. Nos. 3,759,223; 3,785,342; 4,098,230; 4,148,730; and 4,216,090. Efforts in the past to devise a system or method capable of effectively eliminating the need to periodically clean the aquarium tank by hand have not been successful to date.

DISCLOSURE OF THE INVENTION

The present invention provides a method and apparatus for removing waste, debris, and chemical impurities from an aquarium tank and the water supply retained therein without having to empty the tank or disturb the fish or other aquatic life therein. Apparatus according to the invention comprises a movable cleaning means and dislodging arranged adjacent the bottom surface of the tank, adapted to remove waste and debris from adjacent the bottom surface of the tank and means for moving the cleaning means along the bottom surface of the tank so that the cleaning means dislodges waste and debris deposited on the bottom surface and directs the dislodged waste and debris generally toward a location where the dislodged waste and debris is directed upwardly away from the bottom surface of the tank.

As described previously, many conventional aquarium systems used in this country are equipped with a perforated support structure positioned adjacent the bottom surface of the tank having a gravel bed deposited thereon; and an aerating and water directing means for circulating air through the water to supply oxygen to the aquatic plants and animals therein and to induce the water to circulate downwardly through the gravel bed and the support structure. The support structure is normally provided with at least one aperture therein and includes a vertical conduit having one end connected to the aperture and the other end connected to the aerating and water directing means. The apparatus according to a presently preferred embodiment of this invention includes movable cleaning means positioned adjacent the bottom surface of the tank below the support structure, and the moving means includes means for sliding the cleaning means along the bottom surface of the tank to dislodge waste and debris collected thereon and to direct the dislodged waste and debris toward the aperture. It is preferred that an expelling means be employed with the invention that includes a vertical conduit and a water directing means connected to the conduit for drawing water containing the waste and debris from adjacent the bottom surface of the tank upwardly, through the aperture and the conduit.

In accordance with a presently preferred embodiment, the cleaning and dislodging means comprises a barrier structure having a flat base and which has a metallic element incorporated therein. The moving means comprises a hand-held permanent magnet or other magnetic source applied externally to the underside of the tank to pull the barrier structure along the bottom surface of the tank by magnetic attraction to dislodge or otherwise displace waste and debris deposited thereon.

In a presently most preferred embodiment of the invention, the barrier structure extends from the bottom surface of the tank to substantially adjacent the underside of the perforated support structure, and the contour of the upper surface of the barrier structure corresponds to the contour of the underside of the support structure to substantially prevent the flow of waste and debris around the moving barrier structure and to more efficiently clean the tank. Specifically, as the barrier structure moves closer to the conduit, the suction created by the water directing means will be concentrated over a decresing volume; and the force of the suction will increase permitting waste and debris to be more effectively drawn up into the conduit from the bottom surface. In addition, the increased suction will also tend to draw waste and debris that may accumulate on the underside of the support structure into the conduit, and thus help to maintian it in a cleaner condition as well.

The water directing means may comprise an electric pump or a siphon pump connected to the conduit to draw water upwardly into the conduit; or in an even further embodiment, it may comprise an air pump which releases air into the conduit thereby inducing water to flow upwardly through the conduit. In the later embodiment, the upper end of the conduit may be connected to a filtering device which is external of the tank whereby the water carrying the waste and debris which is induced upwardly through the conduit is directed through the filtering device and returned to the main water supply in the tank.

Alternatively, the conduit may be designed to direct water carrying waste and debris to an external receptacle. In this embodiment, the water carrying the waste and debris may be simply disposed of and replaced by adding fresh water to the tank, or, alternatively, returned to the tank by pouring the water into the tank through a funnel-shaped filtering device supported on the upper edge of the tank. In either such embodiments, however, it should be understood that only a portion of the water will be removed from the tank to be later replaced or returned to the tank. A substantial portion of the water supply will remain in the tank, making it unnecessary to remove the fish from the tank and minimizing the risk of shock to the fish.

The invention also provides a method for dislodging waste and debris deposited on the bottom surface of a fish tank which includes the steps of drawing water from a tank from a location adjacent the bottom surface thereof dislodging, and moving waste and debris deposited on the bottom surface of the tank toward the location to permit the waste and debris to be drawn out of the tank with the drawn water. The drawing step may include filtering the drawn water and directing the filtered water back into the tank, or directing the drawn water to a position external of the tank for later treatment or disposal.

Further advantages and details of the invention will become apparent hereinafter in conjunction with the following detailed description of the best modes for carrying out the invention.

BRIEF DESCRIPTION OF THE DRAWINGS

FIG. 1 is a perspective view of an aquarium tank incorporating cleaning and filtering apparatus according to a presently preferred embodiment of the invention;

FIG. 3 is a partial end view of the tank of FIG. 1 illustrating an alternative embodiment of the invention;

FIG. 5 is a partial perspective view of an aquarium tank illustrating yet a further embodiment of the invention; and FIG. 6 is a bottom view of the filtering device of FIG. 5.

BEST MODES FOR CARRYING OUT THE INVENTION

Figure 4:
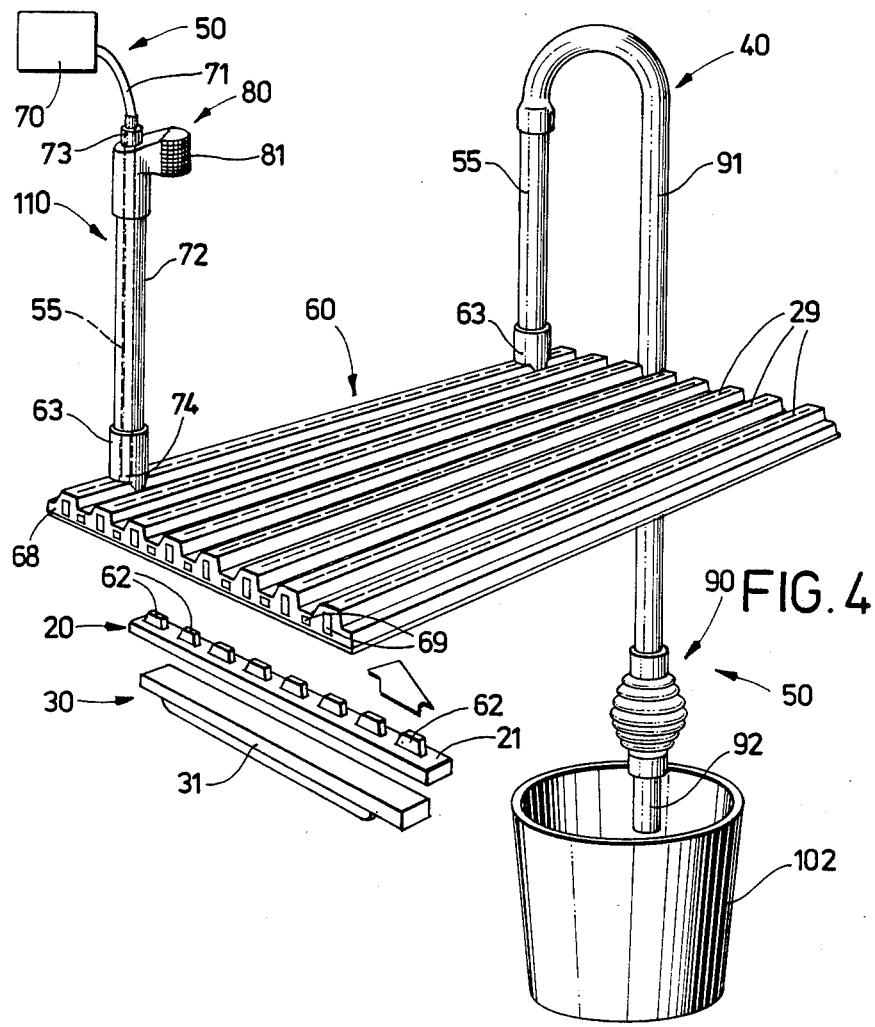
FIG. 4 is a perspective view illustrating further alternative embodiments of the cleaning and filtering apparatus of the invention.

FIG. 1 schematically illustrates an apparatus 10 for cleaning and filtering an aquarium according to presently preferred embodiments of the invention. The aquarium includes a tank 15 having side walls 16 and a bottom surface 17, and apparatus 10 generally includes a movable cleaning and dislodging means 20 positioned adjacent bottom surface 17, means 30 for moving cleaning means 20 along the bottom surface one or more expelling means 40 for expelling waste and debris from the tank is also preferably included. As will be described more fully hereinafter, cleaning means 20 is movable along a path adjacent bottom surface 17 of the tank so that it slidably engages bottom surface 17, thereby dislodging particulate waste and debris collected thereon. The moving means 30 is adapted to direct cleaning means 20 generally toward one or the other expelling means 40 to expel the dislodged waste and debris from the tank.

Each expelling means 40 comprises a vertical conduit 55 having one end positioned adjacent bottom surface 17 and other end connected to a water directing means generally disignated by reference number 50. Directing means 50 is adapted to draw water carrying dislodged waste and debris 25 from adjacent the bottom of the tank upwardly through conduit 55 to be processed or disposed of as will be explained hereinafter. Directing means 50 may be submersed within the tank or located externally of the tank.

Apparatus 10 is particularly designed for use in aquarium equipped with a perforated support structure 60 positioned adjacent bottom surface 17 and adapted to support a gravel bed 62 deposited thereon. Support structure 60 defines a lower compartment 64 between the structure and the bottom surface 17 of the tank, and, typically, such structure provides access to the lower compartment via a vertical conduit 55 having its lower end connected to the support structure 60 by a collar 63 which defines an aperture 61 extending through the support structure. The support structure may have two apertures 61 on opposite sides thereof, and two conduits 55 connected to the apertures as shown in FIG. 1, or only a single aperture and conduit.

The perforations 29 in the support structure (see FIGS. 2 and 4) permit water to flow downwardly therethrough to be cleaned by aerobic bacteria in the gravel bed, while preventing the gravel from falling therethrough. As indicated previously, however, the aerobic bacteria are not able to fully clean the water and waste and debris tends to gradually accumulate on the bottom surface 17, and surface 17 must be periodically cleaned.

Figure 2:
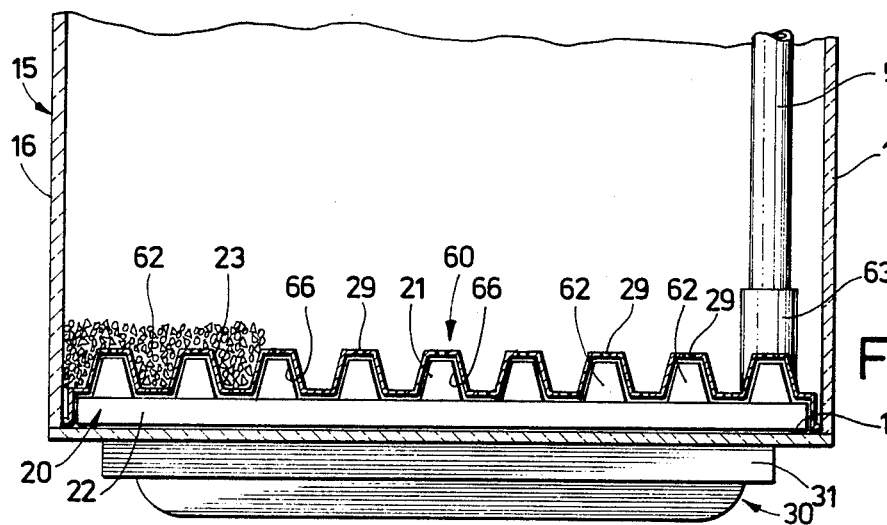
FIG. 2 is a partial end view of the tank of FIG. 1.

The cleaning means 20 is illustrated in greater detail in FIGS. 2 and 4 and comprises a barrier structure 21 which includes a metallic element 22 of steel or the like encapsulated within a plastic covering 23 to protect the metal from corrosion by the water. Moving means 30 preferably comprises a magnetic source 31 such as a hand-held permanent magnet which is adapted to be positioned externally of the underside of the tank to pull barrier structure 21 along bottom surface 17 of the tank in sliding engagement therewith by magnetic attraction in order to dislodge waste and debris 25 therefrom and to direct the waste and debris toward an aperture 61 whereby water directing means 50 draws water carrying the waste and debris from the lower compartment upwardly through conduit 55.

Barrier structure 21 preferably extends from bottom surface 17 to substantially adjacent support structure 60, and the contour of the upper surface of barrier structure 21 preferably corresponds to the contour of the underside of support structure 60. In FIG. 2, support structure 60 has a plurality of longitudinal channels 66 formed therein and the upper surface of barrier structure 21 is formed to have a plurality of ridges 62 which substantially mate with the channels. In FIG. 3, support structure 60 has rounded longitudinal troughs 67 formed therein and the upper surface of the barrier structure is shaped to substantially mate with the troughs. If desired, the upper surface of barrier structure 21 may also be formed to be substantially flat so as to be usable with support structures of differing configuration; however, it is generally preferred that the barrier structure 21 extend from bottom surface 17 to substantially adjacent the underside of support structure 60 with the contour of its upper surface generally corresponding to the shape of the support structure to enable the barrier structure 21 to more effectively maintain the waste and debris in front of the barrier structure and to more effectively sweep and direct dislodged waste 25 toward an aperture 61.

Although in the embodiments illustrated herein, only a single barrier structure is employed, it should be understood that two or more separate barrier structures may be positioned in the tank if desired. Multiple barrier structures may be preferred, for example, if the support structures includes centrally positioned support legs or the like that would interfere with the movement of a single barrier structure along the bottom surface of the tank. When two or more barrier structures are utilized, they may be moved independently by the magnetic source or aligned to permit the magnetic source to move them simultaneously.

Water directing means 50 may take various forms. In FIG. 1, the water directing means connected to the right conduit 55 in the FIG. is shown schematically and the water directing means connected to the left conduit is shown as comprising an electric pump 52.

In FIG. 4, the water directing means 50 connected to the left conduit 55 includes an air pump 70 connected to an air stem 72 by a hose 71. The air stem, shown in phantom lines, has one end connected to air hose 71 and its other end extending into conduit 55. Air hose 71 is joined to air stem 72 at a junction 73 which provides a gas-tight seal for delivering compressed air from air pump 70 into conduit 55. The lower end 74 of air stem 72 is preferably positioned near the lower end of conduit 55 to induce water in the lower compartment 64 of the tank carrying waste and debris to flow upwardly through conduit 55. In the embodiment shown on the left hand side of FIG. 4, the upper end of conduit 55 is connected to a filtering device 80 having filtering material contained therein. Filtering device 80 has a perforated inflow passage (not shown) coupled to the conduit 55, and a perforated outflow passage 81 to allow water to flow from the conduit through the device while retaining the filtering material therein.

In operation, air pump 70 directs compressed air through air hose 71 and air stem 72 releasing air at the end 74 of air stem 72 in the form of bubbles which flow upwardly in conduit 55 and flow through filtering device 80 into the main water supply of the tank, thereby providing aeration to the tank to supply oxygen to the aquatic plants and animals. The upward flow of the air bubbles also draws water from lower compartment 64 upwardly through conduit 55 and through the filtering device 80 and is returned to the main water supply through perforated outflow passage 81. Filtering device 80 removes physical and chemical impurities from the water as the water passes therethrough. Filtering device 80 may be disposable or designed to permit replacement of the filtering material therein after a period of use.

An even further embodiment of the invention is shown in FIG. 4, wherein the water directing means 50 comprises a siphon pump 90 connected to the conduit 55 on the right side of the FIG. by a siphon hose 91. Siphon pump 90 draws water and any waste and debris carried thereby from the lower compartment up through the conduit 55 and the hose 91, through the pump and into a receptable 102 through an outlet hose 92. It is possible that siphon hose 91 may be directly connected to collar 63 formed in perforated structure 60, thereby alleviating the need for a separate conduit structure. Collar 63 may also be provided with a cap to close aperture 61 when not in use.

Although FIGS. 1 and 4 illustrate the use of different water directing means connected to the conduits 55 therein, this was done primarily for ease in illustrating the various embodiments of the invention. In a system which includes two conduits providing access to the lower compartment of a tank, the same type of water directing means will normally be connected to both conduits, or a water directing means may be connected to only one of the conduits.

It should also be appreciated that support structure 60 need not necessarily have one or more apertures 61 formed therein to provide access to the lower compartment 64. Instead, at least one end 68 of the support structure may be spaced from the side wall of the aquarium tank and be provided with perforations 69 as shown in FIG. 4. In such an embodiment, the conduit 55 may be positioned so that its lower end is located between the end 68 of the support structure and the side wall of the aquarium. In such an embodiment, the water directing means 50 would draw water carrying dislodged waste and debris from within the lower compartment 64 through the perforated end 68 and upwardly through conduit 55.

FIGS. 5 and 6 illustrate yet a further embodiment of the invention which includes an external filtering device 100. In the embodiments of FIGS. 5 and 6, waste and debris dislodged from the bottom surface 17 of the tank by barrier structure 21 is drawn out of the tank along with water from the lower compartment 64 as in the previously described embodiments by water directing means 50. The water directing means 50 may include electric pump 62, siphon pump 90 or another suitable structure. In the embodiment of FIGS. 5 and 6, the drawn water carrying the waste and debris is directed to a point externally of the tank such as into a receptacle 102 (FIG. 4) until bottom surface 17 is substantially free of waste and debris.

Filtering device 100 comprises funnel-shaped member 104 having filtering material 106 deposited therein. Filtering material 106 may include, for example, charcoal granules, angel hair and/or spun glass, and the like. As best shown in FIG. 6, filtering device 100 has an L-shaped bracket 108 affixed thereto to removably support the filtering device on an upper corner of the tank. After the water carrying the dislodged waste and debris is collected in receptacle 102, the water is then poured back into the tank through filtering device 100. The water passes through the filtering material which removes physical and chemical impurities from the water, and the filtered water flows through outflow passage 110 and returns to the main water supply of the tank. A screen 112 covers the outflow passage 110 to prevent the filtering material from falling into the tank.

Filtering device 100 can also be used, if desired, to directly filter the water drawn from the lower compartment of the tank, and the filtered water collected in receptacle 102 to be poured directly back into the tank. Alternatively, water carrying dislodged waste and debris drawn from the tank may be disposed of and fresh water poured back into the tank replenishing the main water supply. The water collected in receptacle 102 may also be chemically treated with medicinal agents or water treatment agents, if desired, before the water is poured back into the aquarium.

It should be appreciated that normally only a portion of the water within the tank will be removed from the tank during a cleaning and filtering operation. Accordingly, it is unnecessary to remove fish from the tank during cleaning. Also, because only a portion of the water is removed, the water in the tank will still generally be properly balanced so as to avoid shock to the fish even when fresh water is added to the tank.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

We claim:

1. A system for dislodging and expelling waste and debris from an aquarium tank comprising:
    an aquarium tank having a bottom wall, sidewalls and a support grid arranged adjacent the bottom wall, the supporting grid and the bottom wall defining a lower compartment therebetween;
    a movable barrier means positioned within the lower compartment adjacent the bottom wall of the tank;
    means for expelling waste and debris from within the lower compartment; and
    means for mechanically moving said barrier means along the bottom wall of the tank so that the barrier means slidably engages the bottom wall and dislodges waste and debris deposited thereon and directs the water carrying the dislodged waste and debris generally toward said expelling means to be expelled thereby, said mechanical moving means being located externally of said tank.

2. The dislodging and expelling system as in claim 1 wherein said expelling means comprises:
    a conduit having one end positioned within the lower compartment of said tank; and
    water directing means coupled to the other end of said conduit for drawing water carrying the dislodged waste and debris from within the lower compartment of said tank through said conduit.

3. The dislodging and expelling system as in claim 1 wherein said barrier means comprises an encapsulated metallic member slidable along the bottom wall of said tank, and wherein said mechanical moving means comprises a magnetic means positioned externally of said tank beneath the underside of the bottom wall of said tank.

4. The dislodging and expelling system as in claim 3 wherein said magnetic means comprises a hand-held permanent magnet.

5. A system for cleaning an aquarium tank comprising:
    an aquarium tank having sidewalls, a bottom wall with an inner bottom surface, and a perforated support structure positioned adjacent the bottom wall of the tank, said support structure further defining a lower compartment between said support structure and the bottom wall of said tank and including at least one aperture formed therein;
    expelling means for directing water upwardly through the aperture from within the lower compartment;
    a movable barrier positioned within said lower compartment; and
    means for moving mechanically said barrier within the lower compartment so that the barrier dislodges waste and debris deposited on the inner bottom surface of the tank and directs the dislodged waste and debris generally toward said aperture where the dislodged waste and debris is directed out of said lower compartment through said aperture by said expelling means, and said mechanical moving means being located externally of said tank.

6. The cleaning system as in claim 5 wherein said barrier extends from the bottom surface of the tank to substantially adjacent the underside of the support structure, thereby substantially preventing dislodged waste and debris suspended in the water in front of said barrier from passing around the barrier as the barrier is moved.

7. The cleaning system as in claim 6 wherein said support structure has a contoured underside, and wherein said barrier has an upper surface and a lower surface, the upper surface of said barrier being contoured to substantially mate with the underside of said support structure.

8. The cleaning system as in claim 5 wherein said barrier comprises:
a structure including a metallic element having a flat base adapted to rest on the inner bottom surface of said tank, and wherein said moving means comprises a magnetic means applied externally to the underside of the tank to pull said barrier structure along the inner bottom surface of the tank by magnetic attraction.

9. The cleaning system of claim 8 wherein said barrier structure further includes a liquid-tight casing encapsulating said metallic element.

10. The cleaning system as in claim 5 wherein said expelling means includes a conduit and water directing means, said conduit being adapted to be connected to said aperture at one end and to said water directing means at the other end, said water directing means being adapted to draw water containing said dislodged waste and debris from said lower compartment through said conduit.

11. The cleaning system of claim 10 wherein said water directing means comprises an electric pump.

12. The cleaning system as in claim 10 wherein said water directing means includes:
an air pump; and
an air hose connecting said air pump to a lift tube arranged within said conduit to direct air into said conduit.

13. The cleaning system as in claim 10 wherein said water directing means includes a siphon pump connected to said conduit.

14. The cleaning system as in claim 10 further comprising a receptacle positioned externally of the tank, said water directing means directing drawn water carrying said dislodged waste and debris to said receptacle to be collected therein.

15. A system for cleaning and filtering an aquarium tank and the water supply retained therein comprising:
an aquarium tank having sidewalls, a bottom wall having an inner bottom surface, and a perforated support structure, said support structure being positioned adjacent the bottom wall of the tank to define a lower compartment therebetween, said support structure having at least one aperture formed therein;
conduit means communicating with said lower compartment through said aperture;
a filtering device positioned externally of said tank, said filtering device being adapted to substantially remove chemical and particulate impurities from the water as the water passes therethrough and to return filtered water to said tank;
means for directing water from within the lower compartment through said conduit to said external filtering device;
a movable cleaning barrier positioned within said lower compartment; and
means for moving mechanically said cleaning barrier along the inner bottom surface of the tank so that said cleaning barrier slidably engages the inner bottom surface and dislodges waste and debris collected thereon, said moving means moving said cleaning barrier and said waste and debris dislodged thereby toward said aperture whereby said water directing means directs water having said waste and debris suspended therein from the lower compartment through the conduit means to said filtering device, the water being filtered by said filtering device and returned to the main water supply of the tank, said mechanical moving means being located externally of said tank.

16. The cleaning and filtering system as in claim 15 wherein said cleaning barrier comprises:
a structure having a flat base and an upper surface and including an integral metallic element; and
a casing sealably encapsulating said metallic element.

17. The cleaning and filtering system as in claim 16 wherein said moving means comprises a magnetic means applied externally to the underside of the tank to pull said cleaning barrier along the inner bottom surface of the tank by magnetic attraction so that said flat base is in sliding engagement therewith.

18. The cleaning and filtering system as in claim 15 wherein said water directing means comprises an electric pump having an inflow passage and an outflow passage.

19. The system as in claim 15 wherein said means for directing water and said movable cleaning means comprise a movable plunger-like barrier arranged within the lower compartment.

20. A method for removing waste and debris collected in a lower compartment of an aquarium tank defined by a perforated grid arranged adjacent a bottom wall of the aquarium tank, comprising:
directing water upwardly away from a location adjacent said bottom wall of said tank; and
moving said waste and debris generally toward said location to permit said waste and debris to be expelled from said lower compartment,
said moving and said directing steps inlcuding the step of moving a barrier structure along the bottom wall by mechanical means arranged externally of the tank to dislodge said waste and debris collected on the bottom wall and to direct said waste and debris generally toward said location and upwardly away from said location.

21. The method of claim 20 wherein said directing and moving steps are performed substantially simultaneously.

22. The method as in claim 20 and further comprising the steps of filtering the water drawn from said location to substantially remove physical and chemical impurities from said water; and directing the filtered water back into the main water supply retained in the tank.

23. A method for cleaning an aquarium tank and for filtering the water supply retained therein, said tank having sidewalls, a bottom wall, and a support plate arranged adjacent the bottom wall defining a lower compartment therebetween, said bottom wall having an inner surface and an outer surface, comprising the steps of:
pumping water from a location adjacent the bottom wall of the tank;
dislodging particulate matter which has deposited on the inner bottom surface of the tank;

moving said dislodged particulate matter generally toward said location to permit water containing said dislodged particulate matter to be pumped from said tank;

directing said pumped water to a receptacle arranged externally of said tank; and replenishing the water supply of the tank, said dislodging and said moving steps comprising moving a barrier structure arranged within the lower compartment along the inner surface of the bottom wall of said tank in sliding engagement therewith by mechanical means arranged externally of said tank.

24. The method as in claim 23 wherein said replenishing step comprises replenishing the water supply of the tank with fresh water.

25. The method as in claim 23 wherein said replenishing step comprises returning the pumped water from the receptacle to the tank through a filtering device.

26. The method as in claim 23 wherein said barrier structure includes a metallic component and wherein said moving step comprises moving said barrier structure by an external magnetic means applied to the outer surface of the bottom wall of said tank.

27. The method as in claim 23 wherein said pumping, dislodging, moving and directing steps are performed substantially simultaneously within the lower compartment by said barrier structure.

* * * * *

UNITED STATES PATENT AND TRADEMARK OFFICE
CERTIFICATE OF CORRECTION

PATENT NO. : 4,921,614

DATED : May 1, 1990

INVENTOR(S) : Jay P. Frickman, William E. Kissick, Jr. and Kevin R. McMahon

It is certified that error appears in the above-identified patent and that said Letters Patent is hereby corrected as shown below:

In col. 2, line 54, after "cleaning", delete "means".

In col. 2, line 55, after "dislodging", insert --means--.

In col. 3, line 43, delete "decresing" and insert therefor --decreasing--; line 49, delete "maintian" and insert therefor --maintain--.

In col. 4, line 12, after "thereof", insert a comma (,); line 12, after "dislodging", delete the comma (,); line 51, delete "one" and insert therefor --. One--; line 65, delete "disignated" and insert therfor --designated--.

In col. 5, line 5, delete "aquarium" and insert therefor --aquariums--.

In col. 6, line 2, delete "structures" and insert therefor --structure--.

Signed and Sealed this

Twentieth Day of October, 1992

Attest:

DOUGLAS B. COMER

Attesting Officer     Acting Commissioner of Patents and Trademarks